United States Patent
Meyer et al.

(10) Patent No.: US 11,050,233 B2
(45) Date of Patent: Jun. 29, 2021

(54) FAULT-ARC DETECTION UNIT

(71) Applicant: Siemens Aktiengesellschaft, Munich (DE)

(72) Inventors: Joerg Meyer, Dresden (DE); Peter Schegner, Dresden (DE); Karsten Wenzlaff, Dresden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 317 days.

(21) Appl. No.: 16/305,102

(22) PCT Filed: May 31, 2016

(86) PCT No.: PCT/EP2016/062272
§ 371 (c)(1),
(2) Date: Nov. 28, 2018

(87) PCT Pub. No.: WO2017/207030
PCT Pub. Date: Dec. 7, 2017

(65) Prior Publication Data
US 2020/0321767 A1    Oct. 8, 2020

(51) Int. Cl.
*H02H 1/00* (2006.01)
*H02H 3/38* (2006.01)
(Continued)

(52) U.S. Cl.
CPC ........... *H02H 1/0015* (2013.01); *H02H 3/38* (2013.01); *H02H 3/44* (2013.01); *H02H 3/50* (2013.01);
(Continued)

(58) Field of Classification Search
CPC .......... H02H 1/0015; H02H 3/38; H02H 3/44; H02H 3/50; H02H 3/16; G01R 31/50; G01R 31/52; G01R 31/14; G01R 19/165
(Continued)

(56) References Cited

U.S. PATENT DOCUMENTS 4,780,789 A * 10/1988 Kugler ................ H02H 3/0935
361/87
5,726,577 A    3/1998 Engel et al.
(Continued)

FOREIGN PATENT DOCUMENTS

CA      1210847 A     9/1986
CN    101395777 A     3/2009
(Continued)

OTHER PUBLICATIONS

Chinese Office Action and English translation thereof for Chinese Application No. 2017800461033 dated Jul. 25, 2019.
(Continued)

*Primary Examiner* — Thienvu V Tran
*Assistant Examiner* — Sreeya Sreevatsa
(74) *Attorney, Agent, or Firm* — Harness, Dickey & Pierce, P.L.C.

(57) ABSTRACT

A fault-arc identification unit for a low-voltage electric circuit, includes: at least one voltage sensor for the periodic determination of electric voltage values of the electric circuit; and at least one current sensor for the periodic determination of current values of the electric circuit. Both sensors are connected to an evaluation unit which is designed such that it has as a first criterion a change in the voltage over time which exceeds a first threshold value or falls below a second threshold value, and as a second criterion a change in the increase of current which exceeds a third threshold value or falls below a fourth threshold
(Continued)

value. If both criteria are fulfilled, a fault-arc identification signal is emitted.

23 Claims, 3 Drawing Sheets

(51) Int. Cl.
  *H02H 3/44* (2006.01)
  *H02H 3/50* (2006.01)
  *H02H 3/16* (2006.01)
  *G01R 31/14* (2006.01)
  *G01R 19/165* (2006.01)
  *G01R 31/52* (2020.01)
  *G01R 31/50* (2020.01)

(52) U.S. Cl.
  CPC ............ *G01R 19/165* (2013.01); *G01R 31/14* (2013.01); *G01R 31/50* (2020.01); *G01R 31/52* (2020.01); *H02H 3/16* (2013.01)

(58) Field of Classification Search
  USPC ........................................................ 361/1, 2
  See application file for complete search history.

(56) References Cited

U.S. PATENT DOCUMENTS

| | | | |
|---|---|---|---|
| 6,654,219 | B1 | 11/2003 | Romano et al. |
| 6,987,389 | B1* | 1/2006 | Macbeth ............. H02H 1/0015 324/536 |
| 7,268,989 | B2 | 9/2007 | Parker et al. |
| 2005/0017731 | A1 | 1/2005 | Zuercher et al. |
| 2006/0012931 | A1 | 1/2006 | Engel et al. |
| 2006/0227469 | A1 | 10/2006 | Parker et al. |
| 2007/0086124 | A1 | 4/2007 | Elms et al. |
| 2007/0208520 | A1 | 9/2007 | Zhang et al. |
| 2008/0106832 | A1 | 5/2008 | Restrepo et al. |
| 2008/0129307 | A1 | 6/2008 | Yu et al. |
| 2009/0040665 | A1* | 2/2009 | Elms .................... H02H 1/0015 361/42 |
| 2011/0019444 | A1* | 1/2011 | Dargatz .................. H02H 3/00 363/50 |
| 2011/0128005 | A1 | 6/2011 | Weiher |
| 2012/0056637 | A1* | 3/2012 | Jeong ....................... H02H 3/44 324/759.01 |
| 2012/0134058 | A1* | 5/2012 | Pamer ................ G01R 31/1227 361/42 |
| 2013/0169290 | A1 | 7/2013 | Shea |
| 2014/0071575 | A1 | 3/2014 | Parker et al. |
| 2014/0160603 | A1 | 6/2014 | Parker |
| 2014/0247066 | A1 | 9/2014 | Chaintreuil et al. |
| 2016/0111870 | A1 | 4/2016 | Murano et al. |
| 2016/0187410 | A1 | 6/2016 | Kolker et al. |
| 2016/0241017 | A1 | 8/2016 | Schroeder et al. |

FOREIGN PATENT DOCUMENTS

| | | |
|---|---|---|
| CN | 101523681 A | 9/2009 |
| CN | 101573847 A | 11/2009 |
| CN | 101696986 A | 4/2010 |
| CN | 102401869 | 4/2012 |
| CN | 102565578 A | 7/2012 |
| CN | 102916415 A | 2/2013 |
| CN | 103635820 A | 3/2014 |
| CN | 103645396 A | 3/2014 |
| CN | 203774769 U | 8/2014 |
| CN | 104620349 A | 5/2015 |
| CN | 204462364 U | 7/2015 |
| CN | 104898008 A | 9/2015 |
| CN | 105445587 A | 3/2016 |
| DE | 102013001612 A1 | 8/2013 |
| EP | 0509652 A2 | 10/1992 |
| EP | 0802602 A2 | 10/1997 |
| EP | 2426802 A2 | 3/2012 |
| EP | 2916455 A1 | 9/2015 |
| GB | 2510871 A | 8/2014 |
| TW | 217471 B | 12/1993 |
| WO | WO-2009008871 A1 | 1/2009 |
| WO | WO-2009/156513 A1 | 12/2009 |

OTHER PUBLICATIONS

Chinese Office Action and English translation thereof for Chinese Application No. 2016800879980 dated Jul. 18, 2019.
International Search Report PCT/ISA/210 for International Application No. PCT/EP2016/062271 dated May 31, 2016.
International Search Report PCT/ISA/210 for International Application No. PCT/EP2016/062274 dated May 31, 2016.
International Search Report PCT/ISA/210 for International Application No. PCT/EP2017/062980 dated May 30, 2017.
International Search Report PCT/ISA/210 for International Application No. PCT/EP2016/062273 dated May 31, 2016.
U.S. Appl. No. 16/305,131, filed Nov. 28, 2018.
U.S. Appl. No. 16/305,132, filed Nov. 28, 2018.
U.S. Appl. No. 16/305,120, filed Nov. 28, 2018.
U.S. Appl. No. 16/305,109, filed Nov. 28, 2018.
Chinese Office Action and English translation thereof dated Jul. 18, 2019.
Chinese Office Action and English translation thereof dated Jul. 2, 2019.
Chinese Office Action and English translation thereof for Chinese Application No. 2016800877078 dated Sep. 2, 2019.
PCT International Search Report and Written Opinion of International Searching Authority dated Feb. 24, 2017 corresponding to PCT International Application No. PCT/EP2016/062272 filed May 31, 2016.
U.S. Notice of Allowance for corresponding U.S. Appl. No. 16/305,109 dated Mar. 25, 2021.
U.S. Notice of Allowance for corresponding U.S. Appl. No. 16/305,120 dated Apr. 5, 2021.
U.S. Office Action for corresponding U.S. Appl. No. 16/305,131 dated Apr. 19, 2021.

* cited by examiner

FAULT-ARC DETECTION UNIT

PRIORITY STATEMENT

This application is the national phase under 35 U.S.C. § 371 of PCT International Application No. PCT/EP2016/062272 which has an International filing date of May 31, 2016, which designated the United States of America, the entire contents of which are hereby incorporated herein by reference.

FIELD

Embodiments of the invention generally relate to a fault arc detection unit, a circuit breaker, a short-circuiter and a method for fault arc detection.

BACKGROUND

In low voltage circuits or low voltage installations, or low voltage systems, i.e. circuits for voltages up to 1000 volts AC or 1500 volts DC, short circuits are for the most part linked to fault arcs that arise, such as parallel or series fault arcs. Particularly in powerful distribution installations and switchgear, these can lead to devastating destruction of resources, installation parts or complete switchgear if shutdown is not fast enough. To avoid lengthy and extensive failure of the power supply and reduce injury to persons, it is necessary to detect and extinguish such fault arcs, in particular high-current or parallel fault arcs, in a few milliseconds. Conventional protection systems of power supply installations (e.g. fuses and circuit breakers) cannot afford reliable protection under the obligatory time constraints.

In this context, circuit breakers refers to, in particular, switches for low voltage. Circuit breakers, in particular in low voltage installations, are usually used for currents of from 63 to 6300 amps. More specifically, enclosed circuit breakers, such as molded case circuit breakers, are used for currents of from 63 to 1600 amps, in particular from 125 to 630 or 1200 amps. Exposed circuit breakers, such as air circuit breakers, are used in particular for currents of from 630 to 6300 amps, more specifically from 1200 to 6300 amps.

Circuit breakers within the meaning of embodiments of the invention can have in particular an electronic trip unit, also referred to an ETU for short.

Circuit breakers monitor the current flowing through them and interrupt the electric current or flow of energy to an energy sink or a load, referred to as tripping, when current limit values or current/period limit values, i.e. when a current value is present for a certain period, are exceeded. Trip conditions can be ascertained and a circuit breaker tripped by way of an electronic trip unit.

Short-circuiters are specific devices for shorting lines or power rails in order to produce defined shorts to protect circuits and installations.

Conventional fault arc detection systems evaluate the emission of light produced by the arc and thereby detect the fault arc.

SUMMARY

The inventors have discovered that this has the disadvantage that optical fibers or optical detection systems need to be laid parallel to the electrical lines or power rails in order to detect any fault arcs that occur.

At least one embodiment of the present invention demonstrates an opportunity for fault arc detection.

Embodiments of the present invention are directed to a fault arc detection unit, a circuit breaker, a short-circuiter and a method.

According to at least one embodiment of the invention, there is provision for a fault arc detection unit for a low voltage electrical circuit to have at least one voltage sensor, for periodically ascertaining electrical voltage values (un, un−1) of the electrical circuit, and at least one current sensor, for periodically ascertaining current values of the electrical circuit, which are connected to an evaluation unit. These are configured such that, as a first criterion, a change in voltage with respect to time that is above a first threshold value SW1 or below a second threshold value SW2 has to be satisfied—a check only needing to be performed for one of the two conditions, i.e. it would be possible for only a check for values above the first threshold value to take place, for example.

According to at least one embodiment of the invention, a fault arc detection unit for a low-voltage electrical circuit is disclosed, comprising:

at least one voltage sensor, to periodically ascertain electrical voltage values of the electrical circuit; and at least one current sensor, to periodically ascertain current values of the electrical circuit, the at least one voltage sensor and the at least one current sensor being connected to an evaluation unit wherein, the evaluation unit being configured to satisfy a first criterion upon a change in voltage with respect to time, for the electrical voltage values periodically ascertained, being above a first threshold value or being below a second threshold value, and, satisfy a second criterion upon a difference in a current rise, for the current values of the electrical circuit, being above a third threshold value or being below a fourth threshold value, and wherein, upon the first criterion and the second criterion being satisfied, a fault arc detection signal is delivered.

According to at least one embodiment of the invention, a circuit breaker for a low voltage electrical circuit, comprises:

the fault arc detection unit of at least one embodiment, connected to the circuit breaker, configured such that delivery of the fault arc detection signal results in the circuit breaker tripping to interrupt the electrical circuit.

According to at least one embodiment of the invention, a short-circuiter, comprises:

the fault arc detection unit of at least one embodiment, connected to the short-circuiter, configured such that delivery of the fault arc detection signal results in the short-circuiter shorting the electrical circuit to cause extinguishing of the fault arc.

According to at least one embodiment of the invention, a method for fault-arc detection for a low voltage electrical circuit, comprises:

periodically ascertaining electrical voltage values of the low voltage electrical circuit;

periodically ascertaining electrical current values of the low voltage electrical circuit; and delivering a fault arc detection signal upon:
  a change in voltage with respect to time, for the electrical voltage values periodically ascertained, being above a first threshold value or below a second threshold value, and
  a change in a current rise, for the electrical current values periodically ascertained, being above a third threshold value or being below a fourth threshold value.

BRIEF DESCRIPTION OF THE DRAWINGS

The described properties, features and advantages of this invention and the way in which they are achieved will become clearer and more distinctly comprehensible in conjunction with the description of the example embodiments that follows, the example embodiments being explained in more detail in conjunction with the drawings, in which.

DETAILED DESCRIPTION OF THE EXAMPLE EMBODIMENTS

Figure 1:
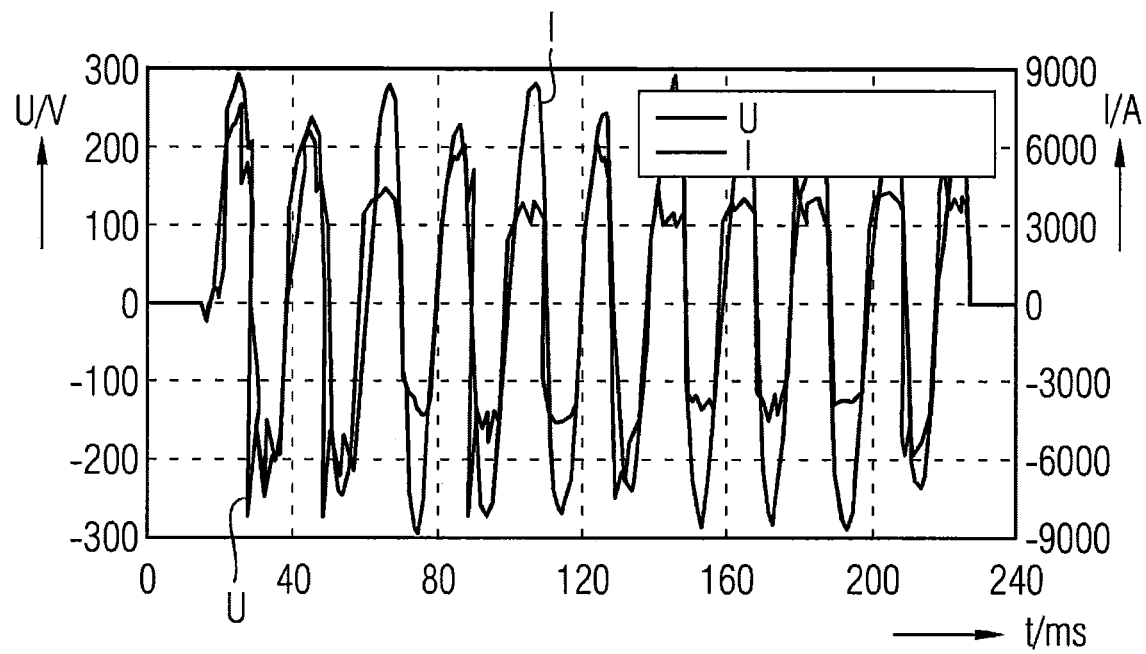
FIG. 1 shows a graph of the voltage and current waveforms following arc ignition.

According to at least one embodiment of the invention, there is provision for a fault arc detection unit for a low voltage electrical circuit to have at least one voltage sensor, for periodically ascertaining electrical voltage values (un, un−1) of the electrical circuit, and at least one current sensor, for periodically ascertaining current values of the electrical circuit, which are connected to an evaluation unit. These are configured such that, as a first criterion, a change in voltage with respect to time that is above a first threshold value SW1 or below a second threshold value SW2 has to be satisfied—a check only needing to be performed for one of the two conditions, i.e. it would be possible for only a check for values above the first threshold value to take place, for example.

As a second criterion, there must be a difference in the current rise that is above a third threshold value SW3 or below a fourth threshold value SW4—a check only needing to be performed for one of the two conditions, i.e. it would be possible for only a check for values below the fourth threshold value to take place, for example.

Satisfaction of both criteria results in a fault arc detection signal being delivered.

In general terms, in respect of the voltage, the change in the voltage with respect to time is compared with threshold values and values above or values below a threshold value result in the first criterion being satisfied.

The magnitudes of the first and second threshold values SW1, SW2 may be identical in this instance, only the arithmetic sign differing.

A fundamental aspect of at least one embodiment is that sudden voltage changes or rapid changes in the voltage that are above (e.g. in the case of positive voltage changes) or below (e.g. in the case of negative voltage changes or the negative half-cycle) a threshold are detected and lead to a fault arc detection signal. Fault arcs have very sudden voltage changes when the arc ignites. These are detected according to the invention and form a criterion for delivery of a fault arc detection signal.

In respect of the current, the difference in the current rise, i.e. the difference in the rise or fall in the current with respect to time, is ascertained. If the difference is above/below certain threshold values, in particular in the event of a reduction in the current rise, a further criterion for a fault arc detection signal is satisfied.

In the case of signed changes in the current rise, for example in the case of AC current, the rising or falling edge of the—ideally—sinusoidal AC current and the type of difference calculation can govern whether values below, for example a reduction in the current rise for a rising edge can result in a negative difference, with a check being performed for values below a (negative) threshold value; or values above, for example falling edges of the AC current (the sine wave from 90° to 270°) can result (depending on the difference calculation) in a positive difference in the event of a reduction in the current rise, the difference being checked for whether it is above a threshold value.

A fundamental aspect of at least one embodiment is that the magnitudes of the difference are above a threshold value in order to deliver a fault arc detection signal. In the simplest case, however, a check on magnitudes does not have to take place, but rather a check on the (absolute) difference in respect of an (absolute) threshold value can be effected, for example.

A fundamental aspect of at least one embodiment is that changes—in particular reductions—in the current rise that are below the usual current rise in the current in the circuit are detected and lead to a fault arc detection signal. In this instance, the usual current rise device(s), by way of example, the sinusoidal current rise in the AC current in a standard circuit, for example a low voltage circuit, e.g. at 230/400 volts rated voltage and 50 Hz mains frequency. In the case of the cited low voltage circuit, this means the rise in the ideally sinusoidal current. Fault arcs have reductions in the current rise when the arc ignites. These are detected according to at least one embodiment of the invention and satisfy a criterion for a fault arc detection signal.

According to at least one embodiment of the invention, checks are performed both in respect of sudden voltage changes and in respect of differences in the current rise. If both criteria are satisfied, a fault arc detection signal is delivered. This has the particular advantage that there is a particularly reliable opportunity for fault arc detection.

Advantageous configurations of the invention are specified in the claims.

In one advantageous configuration of at least one embodiment of the invention, the evaluation unit is configured such that a voltage difference (dun) is continually ascertained from two temporally successive voltage values (un, un−1). The voltage difference (dun) is divided by the difference in the voltage values (un, un−1) with respect to time (dtn). The thus ascertained first difference quotient (Dqun) for the voltage, as a measure of the change in the voltage with respect to time, is compared with the first threshold value (SW1). Values above the first threshold value result in a criterion for a fault arc detection signal being satisfied.

This has the particular advantage that fault arc ascertainment is performed for positive changes in the voltage with respect to time that are above the threshold value. That is to say that changes relating to positive changes, or the positive half-cycle, in the voltage are detected. There is therefore a simple opportunity for ascertainment available.

In one advantageous configuration of at least one embodiment of the invention, the evaluation unit is configured such that a voltage difference (dun) is continually ascertained from two temporally successive voltage values (un, un−1). The voltage difference (dun) is divided by the difference in the voltage values (un, un−1) with respect to time (dtn). The first difference quotient (Dqun) ascertained therefrom, as a measure of the change in the voltage with respect to time, is compared with the second threshold value (SW2). Values below the second threshold value result in a criterion for a fault arc detection signal being satisfied.

This has the particular advantage that fault arc ascertainment is performed in consideration of negative changes in the voltage with respect to time that are below the threshold value. That is to say that changes relating to negative changes, or the negative half-cycle, in the voltage are detected. There is therefore a further simple opportunity for ascertainment available.

In one advantageous configuration of at least one embodiment of the invention, the evaluation unit is configured such that a voltage difference (dun) is continually ascertained from two temporally successive voltage values (un, un−1). The voltage difference (dun) is divided by the difference in the voltage values (un, un−1) with respect to time (dtn). The magnitude of the first difference quotient (Dqun) ascertained therefrom, as a measure of the change in the voltage with respect to time, is compared with the first threshold value (SW1). Values above the first threshold value result in a criterion for a fault arc detection signal being satisfied. This has the particular advantage that fault arc ascertainment is performed for both positive and negative changes in the voltage with respect to time, since the unsigned magnitude of the change in the voltage with respect to time is evaluated. If the magnitude is above the first threshold value, a fault arc detection signal is provided. There is therefore an opportunity for ascertainment available for both positive and negative voltage changes or sudden voltage changes.

In one advantageous configuration of at least one embodiment of the invention, the current must exceed a fifth threshold value SW5 in order to deliver a fault arc detection signal. That is to say that a further criterion must be satisfied, a value above the fifth threshold value SW5, before a fault arc detection signal is delivered.

This has the particular advantage that even more accurate detection of fault arcs is enabled, since they frequently occur only at higher currents. It is therefore possible for erroneous fault arc detection signals to be avoided.

As an alternative or in addition to the fifth threshold value, another criterion may also be satisfied, for example the presence of an audible and/or visual fault arc signal. This can be linked to the previous one in an analogous manner. Thus, more accurate detection of a fault arc is possible on the basis of a further criterion. This avoids erroneous fault arc signals.

In one advantageous configuration of at least one embodiment of the invention, the electrical current value ascertained is either a value of measured electrical current value (in) and/or a value for the change in the electric current with respect to time (i'n), or difference quotient (dqin). It is thus possible for the current value to be ascertained by a standard current sensor, for example. The change in the electric current with respect to time can be provided by a Rogowski coil, for example.

This has the advantage that both standard current sensors and current change sensors can be used for the invention. In particular when sensors that ascertain the change in the electric current with respect to time are used, simple ascertainment of the difference in the current rise is possible.

In one advantageous configuration of at least one embodiment of the invention, the evaluation unit is configured such that if current values are ascertained then a current difference (din) is continually ascertained from two temporally successive current values (in, in−1), and the current difference (din) is divided by the difference in the current values with respect to time (dtn) in order thus to ascertain a difference quotient (dqin) as a value for the change in the electric current with respect to time.

This has the particular advantage that there is a particularly simple opportunity for ascertainment of the change in the electric current with respect to time.

In one advantageous configuration of at least one embodiment of the invention, the evaluation unit is configured such that the ascertained or measured second difference quotient (dqin) for current is subtracted from the preceding difference quotient (qdin−1). In the case of a first calculation, the preceding difference quotient has the value zero. The difference (Ddqin) ascertained therefrom is, as a measure of the change in the current rise, compared with the third threshold value SW3. Values above the third threshold value result in a criterion for a fault arc detection signal being satisfied.

This has the particular advantage that for a falling edge in the current profile the changes in the current with a significant reduction in the current rise allow detection of a fault arc. There is therefore a simple opportunity for ascertainment available.

In one advantageous configuration of at least one embodiment of the invention, the evaluation unit is configured such that the ascertained or measured second difference quotient (dqin) is subtracted from the preceding difference quotient (dqin−1). The difference (Ddqin) ascertained therefrom for the difference quotient, as a measure of the change in the current rise, is compared with the fourth threshold value SW4. Values below the fourth threshold value result in a criterion for a fault arc detection signal being satisfied.

This has the particular advantage that consideration of a rising edge of the current with a reduction in the current rise allows detection of a fault arc. There is therefore a further simple opportunity for ascertainment available.

In one advantageous configuration of at least one embodiment of the invention, the evaluation unit is configured such that the ascertained or measured second difference quotient (dqin) is subtracted from the preceding difference quotient (dqin−1). The magnitude of the difference (Ddqin) ascertained therefrom for the difference quotient, as a measure of the change in the current rise, is compared with the third threshold value SW3. Values above the third threshold value result in a criterion for a fault arc detection signal being satisfied.

This has the particular advantage that detection of a fault arc is possible in consideration of both falling and rising edges of the current with reductions in the current rise. There is therefore an opportunity for ascertainment available for both falling and rising edges in the event of current changes, in particular for AC current.

According to at least one embodiment of the invention, a circuit breaker for a low voltage electrical circuit is further provided. The circuit breaker has a fault arc detection unit according to at least one embodiment of the invention. The fault arc detection unit is connected to the circuit breaker, these being configured such that delivery of a fault arc detection signal results in the circuit breaker tripping, i.e. interrupting the electrical circuit. Extinguishing of the fault arc can therefore be achieved. If the circuit breaker has an electronic trip unit, very fast tripping of the circuit breaker can be achieved when a fault arc detection signal is present. This has the particular advantage that a circuit breaker is extended by a further, advantageous functionality for protecting electrical installations. In this instance, the detection and isolation of fault arcs are advantageously effected in one device. If need be, available assemblies, such as voltage and/or current sensors, power supply unit, microprocessors for the evaluation unit, etc., can also be used and can thus attain synergies.

According to the invention, a short-circuiter, having a fault arc detection unit connected to the short-circuiter, is further provided. These are configured such that delivery of a fault arc detection signal results in the short-circuiter shorting the electrical circuit in order to cause extinguishing of the fault arc.

This has the particular advantage that there is a simple, fast and effective opportunity available for extinguishing fault arcs.

According to at least one embodiment of the invention, a method for fault arc detection for an electrical circuit is furthermore provided. This involves periodically ascertaining electrical voltage values (un, un−1) and electrical current values (in, in−1) of the circuit. Values above a first threshold value (SW1), or alternatively, or in parallel, values below a second threshold value (SW2), for the change in the voltage with respect to time result in a first criterion being satisfied. A change in the current rise that is above a third threshold value (SW3), or alternatively, or in parallel, below a fourth threshold value (SW4), results in a second criterion being satisfied. If both criteria are satisfied, a fault arc detection signal is delivered.

This has the particular advantage of a simple method for fault arc detection.

All configurations and features of at least one embodiment of the invention bring about an improvement in the detection of fault arcs or the extinguishing thereof.

In a circuit or system in which there is a fault arc, a current and voltage profile can be measured that has a significant trend. A typical voltage and current profile for a fault arc is depicted in FIG. 1. FIG. 1 shows a depiction of a graph in which the waveform of the voltage U and the electric current I following ignition of an arc or fault arc, in particular a parallel fault arc, in an electrical circuit, in particular a low voltage circuit, is depicted.

The horizontal X axis depicts the time t in milliseconds (ms). The vertical Y axis depicts the magnitude of the voltage U in volts (V) on a linear scale. The right-hand scale depicts the magnitude of the electric current I in amps (A).

Following arc ignition, the current I has an approximately sinusoidal profile. The voltage U in this instance has a "serrated" profile, with rapid voltage changes. Broadly interpreted, the voltage profile is in the form of a squarewave in a first approximation, instead of the usually sinusoidal profile.

In contrast to a pure sinusoidal voltage profile, a highly distorted voltage profile is obtained in circuits or systems in which there is a fault arc. From an abstract point of view, it is possible to see in the voltage profile a square-wave shape that exhibits a highly stochastic component on the plateau. The square-wave shape is characterized in that the arc ignition and the subsequent voltage zero crossings of the AC voltage result in significantly increased voltage changes, subsequently referred to as a sudden voltage change, since the rise in the voltage change is much larger in comparison with a sinusoidal voltage profile.

According to at least one embodiment of the invention, the aim is for such voltage changes or sudden voltage changes to be detected, according to at least one embodiment of the invention using the evaluation unit AE1. There is then a criterion for a fault arc detection signal. In particular, this can involve a detection approach being taken to the effect that sudden voltage changes during arc ignition and the subsequent voltage zero crossings are detected. By way of example, a difference calculation can take place in this regard.

Voltage values (un, un−1) are ascertained continually or periodically, during which the measurement frequency or sampling frequency of the ascertained voltage values (un, un−1) should be a multiple of the frequency of the AC voltage, for example should be in the range from 1 to 200 kHz, more specifically 10 to 40 or 60 kHz, in particular in the range from 40 to 50 kHz.

The ascertained voltage values (un, un−1) are then used to perform a difference calculation, for example, with a difference quotient (Dqun) being calculated for each sample of the voltage (un). In this regard, the difference between the present voltage sample (un) and the preceding voltage sample (un−1) is formed. This difference (dun) is divided by the difference in the voltage samples (un, un−1) with respect to time (dtn), i.e. dtn=tn−tn−1, so as to obtain the difference quotient (Dqun) according to formula 1.

$$Dqun = \frac{u_n - u_{n-1}}{t_n - t_{n-1}} = \frac{dun}{dtn} \tag{1}$$

This difference quotient (Dqun) as a measure of the change in the voltage with respect to time is compared with a threshold value (SW). If the threshold value condition is satisfied, a criterion for a fault arc detection signal is satisfied. As an alternative to formula 1, it is also possible for the present voltage sample (un) to be deducted from the preceding voltage sample (un−1) (dun=(un−1)−(un)). This merely changes the arithmetic sign of the difference quotient. During a comparison in which not magnitudes but rather the absolute values are compared with the threshold value, it is accordingly also necessary to pay attention to and adapt the arithmetic sign of the threshold value.

By way of example, the voltage values 30 volts (un−1) and 50 volts (un) were measured at the interval of time 20 μs, which is consistent with a sampling frequency of 50 kHz.

$$Dqun = \frac{50 \text{ volts} - 30 \text{ volts}}{20 \text{ μs}} = 1 \frac{V}{\text{μs}}$$

The first threshold value could be 0.5 V/μs, for example. The ascertained difference quotient 1 V/μs is above the 0.5 V/μs. A fault arc detection signal is therefore delivered.

A rising edge in the electrical circuit results in this difference quotient (Dqun) according to formula 1 being positive. If this value is above the first threshold value SW1, a criterion for a fault arc detection signal is satisfied. A falling edge results in this difference quotient (Dqun) being negative. If this value is below the second threshold value SW2, a criterion for a fault arc detection signal is satisfied.

The first and second threshold values SW1, SW2 can have the same magnitude and differ merely in the arithmetic sign.

Alternatively, the magnitude of the difference quotient (Dqun) can also be used. If this value is above the first threshold value SW1, a criterion for a fault arc detection signal is satisfied. Therefore, both rising and falling edges result in the fault arc criteria being detected.

In contrast to the voltage profile, the current profile of a fault arc has an almost sinusoidal trend. At the time of the arc ignition, there is a reduction in the current rise, however, which can be explained by the physical, current-limiting effect of arcs. Additionally, a significant rise change occurs in the current profile at every further current zero crossing after ignition of an arc. This significant property in the current profile is meant to be detected by an evaluation unit AE2 according to at least one embodiment of the invention.

The change or reduction in the current rise can be detected by way of a calculation according to the invention, for example. In this regard, current values (in, in−1) are periodically measured or sampled. Sampling or measurement needs to take place at a multiple of the frequency of the AC current used, for example at frequencies in the range from 1 to 100 kHz, more specifically in the range 40-50 kHz.

The change in the current rise can be made by way of calculation of the current second difference quotient dqin for:

$$dqin = \frac{i_n - i_{n-1}}{t_n - t_{n-1}} = \frac{din}{dtn} \qquad (2)$$

This involves a current difference din being continually calculated for two temporally successive current values (in, in−1). The current difference din is divided by the difference in the current values dtn (=tn−tn−1) with the respect to time. This results in the second difference quotient dqin.

The difference is continually calculated from two successive calculation results for the difference quotients dqin and dqin−1, so that the difference in the difference quotient Ddqin is obtained.

$$Ddqin = dqin - (dqin-1) \qquad (3)$$

A threshold value comparison can be used to check that a criterion for a fault arc detection signal SLES is satisfied by evaluating the difference in the difference quotient Ddqin.

As an alternative to formula 2, the preceding current value (in−1) can also be deducted from the present current value (in).

Similarly, as an alternative to formula 3, the present difference quotient (dqin) can be deducted from the preceding difference quotient (dqin−1). In this case, only the arithmetic sign of the resultant difference quotient or the difference changes.

If not the magnitude but rather the absolute value of the difference is compared with a threshold value, it may also be necessary to pay attention to and adapt the correct arithmetic sign of the threshold value.

If, instead of current values, the change in the current with respect to time is ascertained, for example using a Rogowski coil, these values can be directly used as a difference quotient, which means that the difference can be calculated directly.

By way of example, a first current value at 5011 A, a subsequent second current value at 5058 A, a subsequent third current value at 5105 A and a subsequent fourth current value at 5120 A were measured, each time at an interval of 20 μs, which is consistent with a sampling frequency at 50 kHz. That is to say that there is a rising edge of the electric current.

This results in the following difference quotients:

$$dqin-2 = \frac{5058\ A - 5011\ A}{20\ \mu s} = \frac{47\ A}{20\ \mu s} = 2.35\ A/\mu s$$

$$dqin-1 = \frac{5105\ A - 5058\ A}{20\ \mu s} = \frac{47\ A}{20\ \mu s} = 2.35\ A/\mu s$$

$$dqin = \frac{5120\ A - 5105\ A}{20\ \mu s} = \frac{15\ A}{20\ \mu s} = 0.75\ A/\mu s$$

This results in the difference in the difference quotients of:

$$Ddqin-1 = 2.35\frac{A}{\mu s} - 2.35\frac{A}{\mu s} = 0\frac{A}{\mu s}$$

$$Ddqin = 0.75\frac{A}{\mu s} - 2.35\frac{A}{\mu s} = -1.6\frac{A}{\mu s}$$

The fourth threshold value SW4 may be −0.25 A/μs, for example. The third threshold value SW3 can have the same positive magnitude, for example. Since the last difference in the difference quotient (Ddqin) is below the fourth threshold value SW4, a criterion for a fault arc detection signal is satisfied.

That is to say that the fourth current value, at which a significant decrease in the electric current occurs, results in a criterion for a fault arc detection signal being satisfied.

In the event of a falling edge in the electrical circuit, this difference according to the formula is usually positive. If this value is above the third threshold value SW3, a criterion for a fault arc detection signal is satisfied. In the event of a rising edge, this difference is usually negative. If this value is below the fourth threshold value SW4, a criterion for a fault arc detection signal is satisfied.

The third and fourth threshold values SW3, SW4 can have the same magnitude and can differ just in the arithmetic sign.

Alternatively, the magnitude of the difference can also be used. If this value is above the third threshold value SW3, a criterion for a fault arc detection signal is satisfied. Therefore, both falling and rising edges of the electric current, in particular—ideally—sinusoidal AC current, result in fault arc criteria being detected. For a sine wave, there is usually a falling edge in the range from 90° to 270°, and a rising edge in the range from 0° to 90° and 270° to 360°.

Satisfaction of a threshold value condition for the voltage and of a threshold value condition for the current results in a fault arc detection signal being delivered. In particular a realtime or approximately simultaneous occurrence of the two conditions is meant to lead to delivery of a fault arc detection signal. Approximately simultaneous occurrence of the two conditions refers to an occurrence within a complete sinusoidal oscillation of the AC current.

Figure 2:
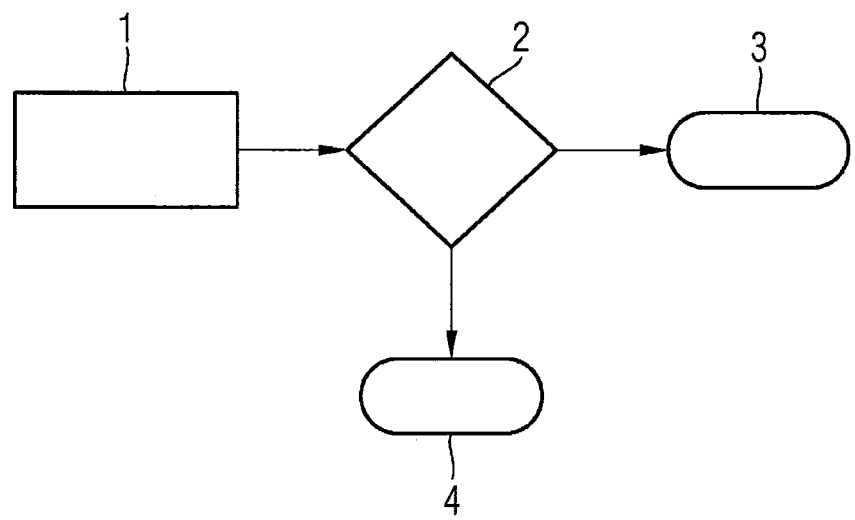
FIG. 2 shows a flowchart for fault arc detection.

A decision chart is depicted in FIG. 2.

According to FIG. 2, a first step (1) involves the first difference quotient at the voltage Dqun being continually calculated and the difference in the second difference quotient of the current Ddqin being continually calculated.

A second step (2) involves these being compared with the respective corresponding threshold value.

In the event of magnitudes above the threshold value for voltage and current, a third step (3) involves the detection of a fault arc being indicated and/or a fault arc detection signal being delivered.

If there are no magnitudes above one of the two threshold values for voltage and current, a fourth step (4) can involve it being reported that there is no fault arc present.

The calculation can be performed continually.

By way of example, according to one configuration, when signed change variables for the voltage are calculated, the comparison can be effected for positive values in consideration of their being above a first, for example positive, threshold value (SW1) and/or for negative values in consideration of their being below a second, for example negative, threshold value (SW2), that is to say if the magnitude of the negative difference is numerically greater than the magnitude of the negative threshold value.

Alternatively, a magnitude (positive) for the change in the voltage can also be formed, which is then compared with the positive first threshold value (SW1), and a value above the first threshold value results in a criterion for a fault arc detection signal being satisfied.

By way of example, according to one configuration, when signed change variables for the current are calculated, the comparison can be effected for positive values in consideration of their being above a third, for example positive, threshold value (SW3) and/or for negative values in consideration of their being below a fourth, for example negative, threshold value (SW4), i.e. if the magnitude of the negative difference is numerically greater than the magnitude of the negative threshold value.

Alternatively, a magnitude (positive) for the change in the current rise can also be formed, which is then compared with the positive third threshold value (SW3), and a value above the third threshold value results in a criterion for a fault arc detection signal being satisfied.

As an alternative or in addition to the fault arc detection signal, it is also possible for either "no fault arc present" or "fault arc present" to be indicated, or for a corresponding distinction to be drawn in the installation.

In addition, the fault arc detection according to at least one embodiment of the invention can be combined with further criteria, for example with a further comparison of the level of the electric current of the circuit. The measured current, in particular the RMS value of the measured current, which can be calculated using the Mann-Morrison method, for example, is in this instance compared with a fifth threshold value SW5, and only if it is also above this fifth threshold value SW5 and the criterion for a fault arc detection signal is satisfied is such a signal also delivered. This criterion, referred to as overcurrent release, leads to reliable fault localization. Fault arc detection requires a minimum fault arc current flow in the circuit in order to give rise to a fault arc detection signal. The threshold value chosen for the overcurrent release may be a value dependent on the operating current. Alternatively, the threshold values could also be stipulated in the manner specific to arcs, since a parallel low voltage arc that is present requires an arc current of usually 1000 A. A series arc is possible at much lower currents. That is to say that the third threshold value SW3 can have any value upward of 1 A, 10 A, 100 A, 1000 A or 5000 A, depending on the use or application.

Figure 3:
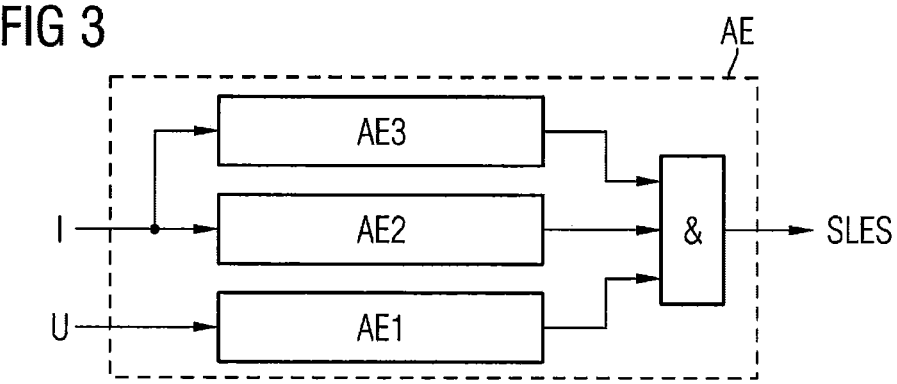
FIG. 3 shows a block diagram of a solution according to an embodiment of the invention.

The link between overcurrent release and the criteria in a fault arc detection unit is shown in FIG. 3.

FIG. 3 shows a depiction in which the ascertained voltage U of the circuit is supplied to a first evaluation unit AE1, for ascertaining the voltage criteria.

The ascertained current I of the circuit is supplied to a second evaluation unit AE2, for ascertaining the current criteria, and alternatively to a third evaluation unit AE3, for ascertaining a current condition, such as a value above the fifth current limit value SW5.

The outputs of the evaluation units AE1, AE2, AE3 are linked to an AND unit &, the output of which delivers a fault arc detection signal SLES when the criteria are satisfied. The three evaluation units may in this instance be arranged as subunits in an evaluation unit AE.

In addition, a fault arc detection signal can be delivered only when a voltage and/or current criterion is satisfied at least twice, e.g. the (difference in the) difference quotient is above a threshold value. Analogously, also only values above a threshold value three times, four times, five times, etc. can lead to a criterion being satisfied. This achieves particularly reliable evaluation and detection of a fault arc.

Analogously, the evaluation can be performed explicitly after a zero crossing, for example. That is to say that after each zero crossing the check according to the invention for the change in the voltage and in the current is performed and only after two, three or more differences are the criteria for delivery of a fault arc detection signal deemed to exist.

Figure 4:
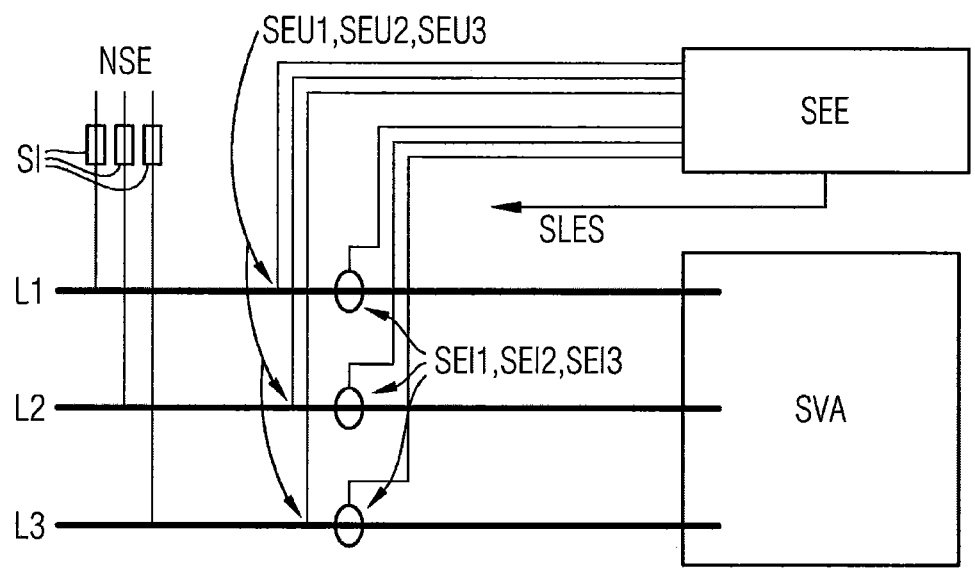
FIG. 4 shows a first depiction to explain the use of an embodiment of the invention.

FIG. 4 shows a schematic depiction of an outline circuit diagram for an installation configuration with an outgoing-circuit-selective fault arc detection unit for detecting fault arcs. FIG. 4 shows a low voltage incoming unit NSE, with fuses SI, which are followed by busbars L1, L2, L3 for the conductors of a three-phase AC system or circuit. The neutral conductor is not depicted. Each of the three busbars L1, L2, L3 has a respective associated voltage sensor SEU1, SEU2, SEU3 and current sensor SEI1, SEI2, SEI3. The busbars are connected to switchgear and/or a distribution installation SVA.

The voltage and current sensors are connected to a fault arc detection unit SEE according to the invention, which has an evaluation unit AE according to the invention. The latter has an output for delivering a fault arc detection signal SLES.

The voltage and current sensors ascertain voltage values (un, un−1) and current values (in, in−1) for the busbars L1, L2, L3 and supply them to the fault arc detection unit SEE according to the invention. The sensors in this instance are arranged outside the fault arc detection unit and connected thereto.

Figure 5:
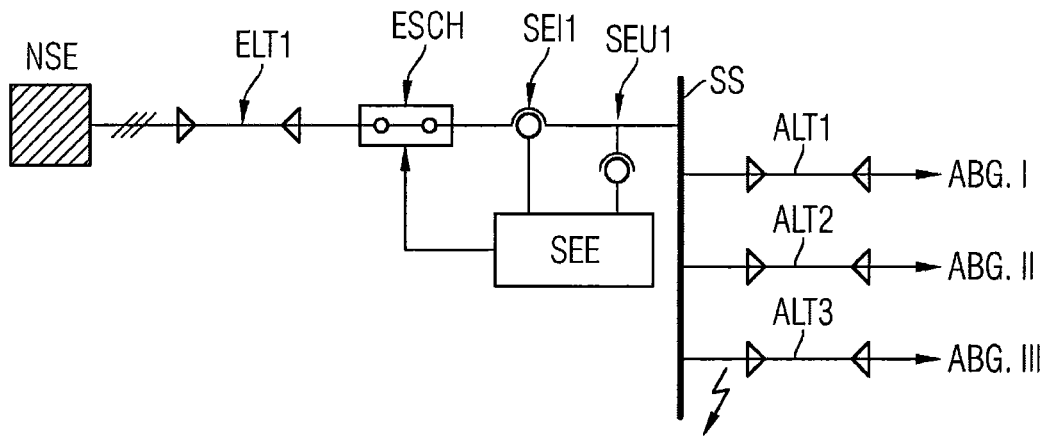
FIG. 5 shows a second depiction to explain the use of an embodiment of the invention.

FIG. 5 shows a further schematic depiction of an outline circuit diagram for an installation configuration with a central fault arc detection unit for detecting fault arcs. FIG. 5 shows a low voltage incoming unit NSE that is followed by a feeder cable ELT1, which is followed by an incoming-feeder disconnector ESCH, which is followed by a current sensor SEI1 and a voltage sensor SEU1, which is followed by a busbar SS. The busbar SS has three outgoing circuits ABG I, ABG II and ABG III provided on it. These each have an associated outgoing-circuit cable ALT1, ALT2, ALT3.

The sensors SEI1, SEU1 are connected to a fault arc detection unit SEE, the output of which is in turn connected to the incoming-feeder disconnector ESCH. The incoming-feeder disconnector may in this instance be a circuit breaker. When a fault arc is detected, the electrical circuit, i.e. the supply of power to the busbar SS, can be interrupted if a fault arc occurs in one of the outgoing circuits, for example.

Figure 6:
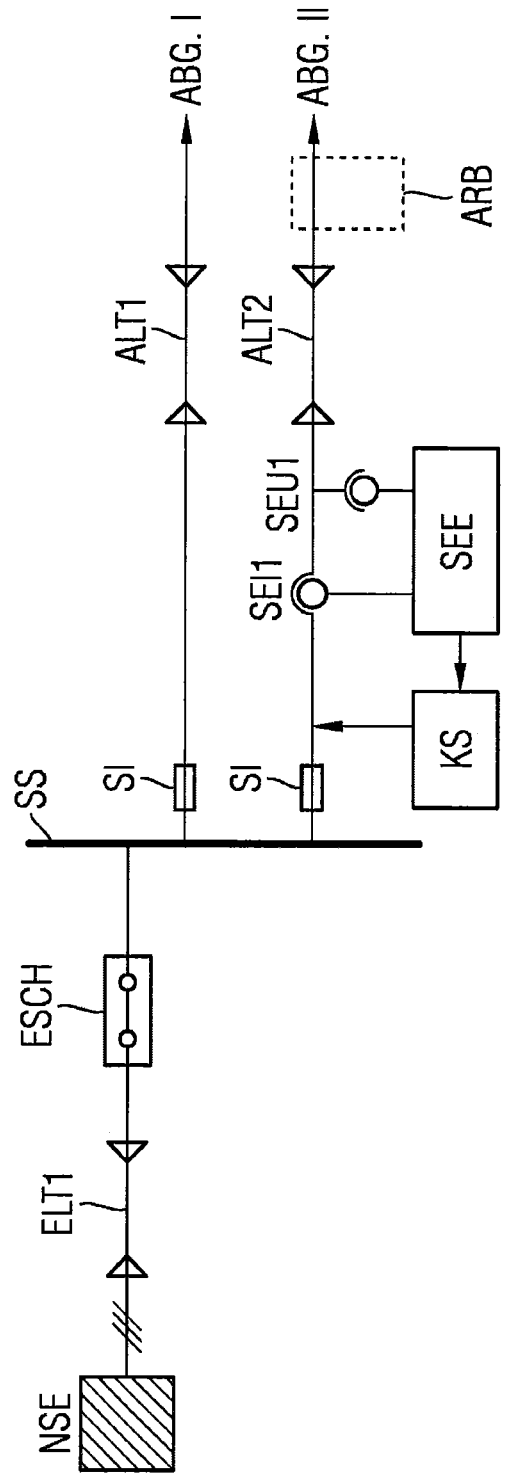
FIG. 6 shows a third depiction to explain the use of an embodiment of the invention.

FIG. 6 shows a depiction according to FIG. 5, with the difference that the sensors are arranged in the second outgoing circuit ABG II, which also has fuses SI and a short-circuiter KS. The sensors SEI1 and SEU1 detect current and voltage values of the outgoing circuit ABG II and forward the values to the fault arc detection unit SEE. If the fault arc detection unit SEE detects a fault arc, its output delivers a fault arc detection signal, which is transmitted to the short-circuiter KS. The latter then shorts the outgoing circuit ABG II in order to extinguish the fault arc.

The fault arc detection system according to FIG. 5 or 6 may be embodied as a mobile system, for example.

An embodiment of the invention will be explained once again below.

An embodiment of the invention can be used to detect fault arcs, in particular parallel or high-current fault arcs, in particular in low voltage switchgear and distribution installations. According to an embodiment of the invention, in particular a numerical solution or detection algorithm is available for this purpose on the basis of the evaluation of measured voltage and current values or signals. For the detection of fault arcs, the voltage and the current are measured and are evaluated using a respective signal profile analysis. Owing to the fast arc detection required in practice, an extraordinarily fast temporal evaluation can be provided for this according to an embodiment of the invention.

An embodiment of the invention allows high-current fault arcs, for example in switchgear and distribution installations, e.g. in the low voltage, to be quickly detected on the basis of a central voltage and current measurement at the incoming unit, for example.

An embodiment of the invention can in particular be advantageously used in or in combination with circuit breakers or short-circuiters.

Complex installation of optical fibers in installations for fault arc detection is not required. The current measurement can be realized centrally and if need be used synergistically by further resources.

Furthermore, implementation in existing switchgear and distribution installations is a simple matter, since a detection system according to the invention can be installed just centrally, for example, and there is no need for installation in individual cells that are to be protected.

An embodiment of the invention may be implemented as an assembly with central current measurement.

The detection systems established on the market to date are based on optical fault detection and therefore have potential for erroneous tripping as a result of the influence of extraneous light (e.g. flashlight). This hazard potential does not exist with the solution according to the invention based on a voltage and current measurement.

Although the invention has been illustrated and described in greater detail by the example embodiment, the invention is not limited by the disclosed examples, and other variations can be derived therefrom by a person skilled in the art without departing from the scope of protection of the invention.

The invention claimed is:

1. A fault arc detection unit for a low-voltage electrical circuit, comprising:
    at least one voltage sensor, to periodically ascertain electrical voltage values of the low-voltage electrical circuit; and
    at least one current sensor, to periodically ascertain current values of the low-voltage electrical circuit, the at least one voltage sensor and the at least one current sensor being connected to an evaluation unit wherein, the evaluation unit being configured to
        satisfy a first criterion upon a change in voltage with respect to time, for the electrical voltage values periodically ascertained, being above a first threshold value or being below a second threshold value, and
        satisfy a second criterion upon a difference in a current rise, for the current values of the low-voltage electrical circuit, being above a third threshold value or being below a fourth threshold value, and
    wherein, upon the first criterion and the second criterion being satisfied, a fault arc detection signal is delivered, wherein the electrical current values of the low-voltage electrical circuit ascertained include at least one of
        values of measured electrical current, and
        values for a change in the electric current with respect to time, and
        difference quotients,
    wherein, upon only values of measured electrical current being ascertained, then values for the change in the electric current with respect to time, or difference quotients, are calculated from the values of measured electrical current, and
    wherein the difference quotient is subtracted from a preceding difference quotient to ascertain a difference in the difference quotients, wherein the difference ascertained in the difference quotients, or a magnitude of the difference ascertained in the difference quotients, is compared with the third threshold value as a measure of a difference in the current rise, and wherein the second criterion is satisfied upon the difference ascertained in the difference quotients, or a magnitude of the difference ascertained in the difference quotients, being above the third threshold value.

2. The fault arc detection unit of claim 1, wherein a third criterion must be satisfied, wherein the current values of the low-voltage electrical circuit periodically ascertained must be above a fifth threshold value, to deliver the fault arc detection signal.

3. The fault arc detection unit of claim 1, wherein delivery of a fault arc detection signal requires a visual signal or audible signal to be present.

4. The fault arc detection unit of claim 1, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the first threshold value.

5. The fault arc detection unit of claim 1, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the second threshold value.

6. The fault arc detection unit of claim 1, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a magnitude of a first difference quotient ascertained therefrom, as a measure of change in voltage with respect to time, is compared with the first threshold value.

7. The fault arc detection unit of claim 1, wherein upon measured electrical current values being ascertained, then a current difference is continually ascertained from two temporally successive current values, and the current difference is divided by a difference in the current values with respect to time in order to ascertain a difference quotient as a value for the change in the electric current with respect to time.

8. The fault arc detection unit of claim 1, wherein the difference quotient is subtracted from a preceding difference quotient to ascertain a difference in the difference quotients, wherein the ascertained difference in the difference quotients is compared with the fourth threshold value as a measure of a difference in the current rise, and wherein and a fault arc detection signal is delivered upon the ascertained difference in the difference quotients being above the fourth threshold value.

9. A circuit breaker for a low voltage electrical circuit, comprising:
the fault arc detection unit of claim 1, connected to the circuit breaker, configured such that delivery of the fault arc detection signal results in the circuit breaker tripping to interrupt the electrical circuit.

10. A short-circuiter, comprising:
the fault arc detection unit of claim 1, connected to the short-circuiter, configured such that delivery of the fault arc detection signal results in the short-circuiter shorting the electrical circuit to cause extinguishing of the fault arc.

11. The fault arc detection unit of claim 2, wherein delivery of a fault arc detection signal requires a visual signal or audible signal to be present.

12. The fault arc detection unit of claim 2, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the first threshold value.

13. The fault arc detection unit of claim 2, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the second threshold value.

14. The fault arc detection unit of claim 2, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a magnitude of a first difference quotient ascertained therefrom, as a measure of change in voltage with respect to time, is compared with the first threshold value.

15. The fault arc detection unit of claim 3, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the first threshold value.

16. The fault arc detection unit of claim 3, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a magnitude of a first difference quotient ascertained therefrom, as a measure of change in voltage with respect to time, is compared with the first threshold value.

17. The fault arc detection unit of claim 3, wherein a voltage difference is continually ascertained, from the electrical voltage values of the low-voltage electrical circuit of two temporally successive voltage values, the voltage difference being divided by a difference, with respect to time, in the voltage values of the low-voltage electrical circuit periodically ascertained, and a first difference quotient ascertained therefrom, as a measure of change in voltage with respect to time, is compared with the second threshold value.

18. A method for fault-arc detection for a low voltage electrical circuit, comprising:
periodically ascertaining electrical voltage values of the low voltage electrical circuit;
periodically ascertaining electrical current values of the low voltage electrical circuit; and
delivering a fault arc detection signal upon:
a change in voltage with respect to time, for the electrical voltage values periodically ascertained, being above a first threshold value or below a second threshold value, and
a change in a current rise, for the electrical current values periodically ascertained, being above a third threshold value or being below a fourth threshold value,
wherein the electrical current values of the low-voltage electrical circuit ascertained include at least one of
values of measured electrical current, and
values for a change in the electric current with respect to time, and
difference quotients,
wherein, upon only values of measured electrical current being ascertained, then values for the change in the electric current with respect to time, or difference quotients, are calculated from the values of measured electrical current, and
wherein the difference quotient is subtracted from a preceding difference quotient to ascertain a difference in the difference quotients, wherein the difference ascertained in the difference quotients, or a magnitude of the difference ascertained in the difference quotients, is compared with the third threshold value as a measure of a difference in the current rise, and wherein the second criterion is satisfied upon the difference ascertained in the difference quotients, or a magnitude of the difference ascertained in the difference quotients, being above the third threshold value.

19. The method of claim 18, wherein the periodically ascertained electrical current values of the low voltage electrical circuit must be above a fifth threshold value for delivery of the fault arc detection signal.

20. The method of claim 18, wherein delivery of a fault arc detection signal requires a visual or audible signal to be present.

21. The method of claim 18, wherein the fault arc detection signal is used to interrupt or short the electrical circuit.

22. The method of claim 19, wherein delivery of a fault arc detection signal requires a visual or audible signal to be present.

23. The method of claim 19, wherein the fault arc detection signal is used to interrupt or short the electrical circuit.

* * * * *